United States Patent
Craven, Jr.

(10) Patent No.: US 7,371,566 B1
(45) Date of Patent: May 13, 2008

(54) COMPOSTING APPARATUS AND METHOD

(75) Inventor: Kenneth M. Craven, Jr., Ellisville, MS (US)

(73) Assignee: Commercial Composting LLC, Hammond, LA (US)

( * ) Notice: Subject to any disclaimer, the term of this patent is extended or adjusted under 35 U.S.C. 154(b) by 805 days.

(21) Appl. No.: 10/361,694

(22) Filed: Feb. 11, 2003

(51) Int. Cl.
*C12M 1/02* (2006.01)
*C12M 1/10* (2006.01)
*C12M 1/00* (2006.01)
*C05F 11/08* (2006.01)
*C05D 9/02* (2006.01)

(52) U.S. Cl. .............. 435/290.3; 435/298.2; 435/286.6; 435/289.1; 435/290.1; 435/290.2; 435/298.1; 71/9; 71/11

(58) Field of Classification Search .......... 435/290.3, 435/298.2, 286.6, 289.1, 290.1, 290.2, 298.1; 71/9, 11

See application file for complete search history.

(56) References Cited

U.S. PATENT DOCUMENTS

| | | | | |
|---|---|---|---|---|
| 3,149,922 A | * | 9/1964 | Lavallee | 422/209 |
| 3,554,454 A | * | 1/1971 | Gruendler | 241/73 |
| 3,845,939 A | * | 11/1974 | Waldenville | 366/151.1 |
| 3,850,364 A | * | 11/1974 | Robbins | 241/51 |
| 4,302,546 A | * | 11/1981 | Schlichting, Jr. | 435/290.2 |
| 5,300,438 A | * | 4/1994 | Augspurger et al. | 435/290.3 |
| 5,346,305 A | * | 9/1994 | Chester | 366/233 |
| 5,457,031 A | * | 10/1995 | Masse | 435/41 |
| 5,534,437 A | * | 7/1996 | Arrau | 435/290.3 |
| 5,591,635 A | * | 1/1997 | Young et al. | 435/286.1 |
| 5,661,031 A | * | 8/1997 | Murphy et al. | 435/290.3 |
| 5,713,788 A | * | 2/1998 | Ferket et al. | 452/138 |
| 5,766,676 A | * | 6/1998 | Park et al. | 427/123 |
| 5,766,876 A | * | 6/1998 | Santiago et al. | 435/41 |
| 5,981,269 A | * | 11/1999 | Park | 435/290.2 |
| 6,110,733 A | * | 8/2000 | Seymour | 435/290.3 |
| 6,264,359 B1 | * | 7/2001 | Buss et al. | 366/220 |
| 7,073,293 B2 | * | 7/2006 | Galer | 49/413 |
| 2002/0144465 A1 | * | 10/2002 | Chang | 49/449 |
| 2004/0016274 A1 | * | 1/2004 | Rudas | 71/9 |
| 2004/0029262 A1 | * | 2/2004 | Walker | 435/290.1 |

FOREIGN PATENT DOCUMENTS

CH 684269 A5 * 8/1994

OTHER PUBLICATIONS

English translation of Laubscher (CH 684269), Aug. 15, 1994.*

* cited by examiner

*Primary Examiner*—Gladys J P Corcoran
*Assistant Examiner*—Nathan A. Bowers
(74) *Attorney, Agent, or Firm*—Ronald E. Greigg (57) ABSTRACT

A composting apparatus including an electric motor driven drum. The drum is provided with spaced fins on the inner surface and a supporting shaft that can include air holes to provide air within the confines of the drum. In this instance, tubes with holes are secured inside the drum and communicate with a source of air so that air passes into the tubes, and thus into the pile of composting material. The drum is provided with a sliding door that closes an opening in the drum. The door is secured at its ends for movement within a grooved mount attached onto a surface of the drum. The door is moved along a surface of the drum to open the door. The door can be held in position with a small opening or to a full open position, thus opening the entire opening in the surface of the drum.

14 Claims, 7 Drawing Sheets

COMPOSTING APPARATUS AND METHOD

This invention is directed to a composting apparatus and method, more particularly an apparatus and method which have advantages over the known prior art.

BACKGROUND AND SUMMARY OF THE INVENTION

Heretofore composting apparatus have been patented which include a rotatable drum which is rotated to help carry out the composting. Apparatus has been patented in which the drum is rotatable about a horizontal axis, including having the drum axis perpendicular to the axis about which the drum is rotated. Such prior art is exemplified by U.S. Pat. Nos. 5,899,803, 5,346,305, 4,687,645 and 3,942,769. These are only a few of the prior art patents; however, these are believed to be the closest prior art to that of the present invention.

It becomes clear to one skilled in the art that a cylindrical drum with end closures has been used for such composting apparatus, and a door is used to add material to the drum and to remove material from the drum. Such doors are usually hinged on the drum and swing outwardly when opened. Such doors require that the drum be stationary for removal of the composted material.

The inventive apparatus of this invention has a door which covers an opening in the cylindrical surface of the drum, and is secured at its ends in a grooved holder so that the door will slide along the surface of the drum so that the door can be opened only a small amount, or can be fully opened. For the inventive apparatus the drum can be rotated with the door partially or fully open so that the composted material can be more easily removed from the drum.

The inventive apparatus includes ventilation means which directs air into the drum to mix with the composting material. In its simplest form, the ventilation means can simply be one or more openings in the ends of the drum. Alternatively, more complex apparatus can include means to force air into the rotating drum.

OBJECTS AND SUMMARY OF THE INVENTION

It is therefore an object of the invention to provide a composting apparatus which is provided with ventilation means which supplies sufficient air into the composting material to aid in composting of the material.

Another object is to provide a door which can be positioned so as to form a variable size opening, from a small opening, on up to a full opening, and hold its position, even while the drum rotates.

Still another object is to provide a composting apparatus which is driven by a motor in which the motor can be controlled by a timer for periodic rotation of the drum.

Yet another object is to provide a compost removal hopper operative with the composting apparatus for removal of the compost material without any compost falling onto the ground.

Other objects and advantages of the invention will become obvious to one skilled in the art subsequent to reviewing the drawings in combination with the description set forth hereinafter.

BRIEF DESCRIPTION OF THE PREFERRED EMBODIMENTS

Figure 1:
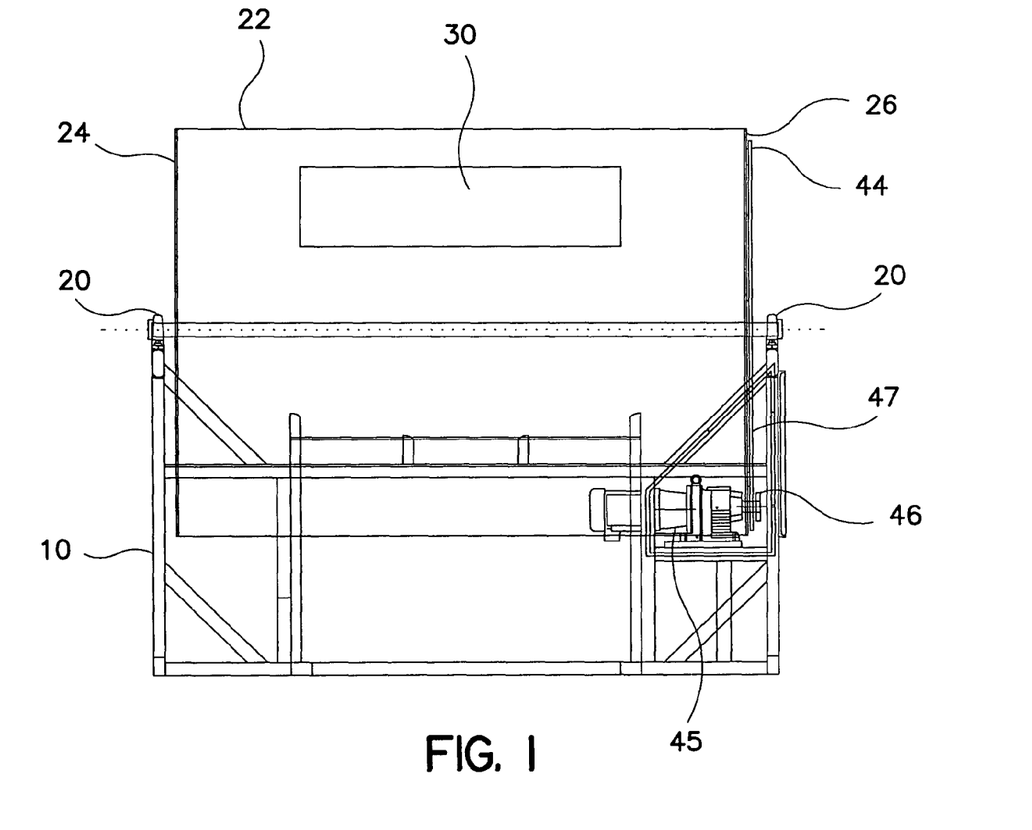
FIG. 1 represents a front view of the composting apparatus.
Figure 2:
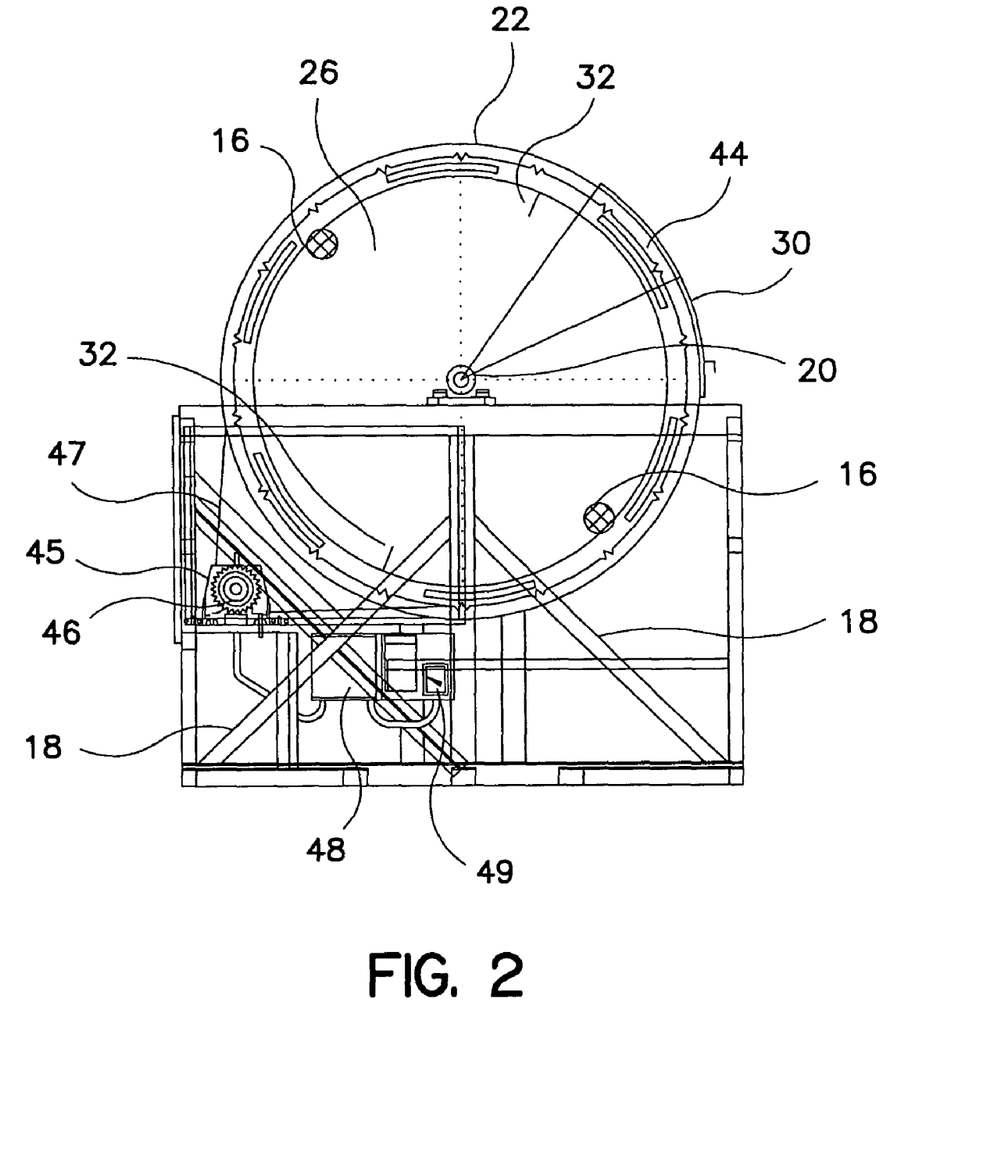
FIG. 2 illustrates an end view of the composting apparatus.

Now, referring to the drawings in which like reference characters represent like parts there is shown in FIG. 1 a front view of the composting apparatus. As shown, the apparatus includes a supporting base 10 formed, for example, of square steel tubing such as 4"×3" members, 2"×3" members, or members of any other desired size, so long as they are of sufficient strength. The base a length and width of any suitable desired size, so long as it is able to hold a drum 22 full of material to be composted. Each of the ends of the frame include pillow blocks 20 that are secured to the rest of the tubing of the frame. Each end of the frame can have, for example, a sort of inverted V-shape formed by tubing 18 such as is generally shown in FIG. 2, as such a shape provides sufficient strength and stability to hold the drum 22 when it is full of material to be composted. However, other arrangements for the tubing which constitutes the frame can be used. The pillow blocks 20 are secured to each end of the frame 10, preferably at or above the apex of the inverted V-shape section of the frame.

The pillow blocks 20 secure a rotating shaft 28 on which a drum 22 is secured for rotation. The cylindrical steel drum 22 has a diameter sufficient to hold a large quantity of material to be composted. It has closed ends 24, 26 and is mounted on an axial, steel shaft 28 which is rotatable in the pillow blocks 20, and thus rotates with the drum.

Figure 8:
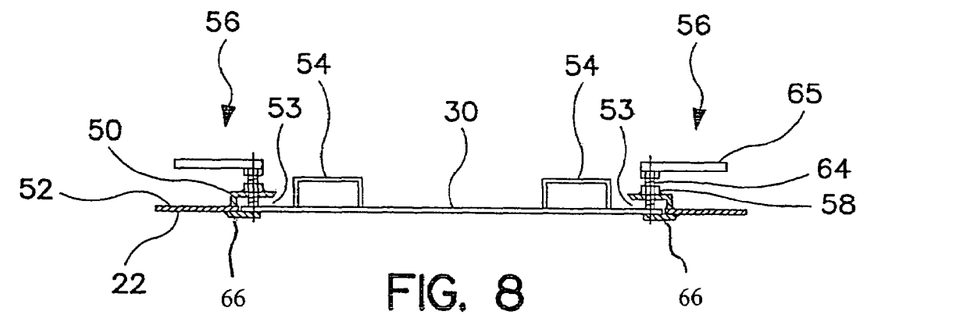
FIGS. 8 and 9 show the door, and details of a track mechanism for the door and locking devices for securing the door in a closed position, an open position, or any partially open position.
Figure 9:
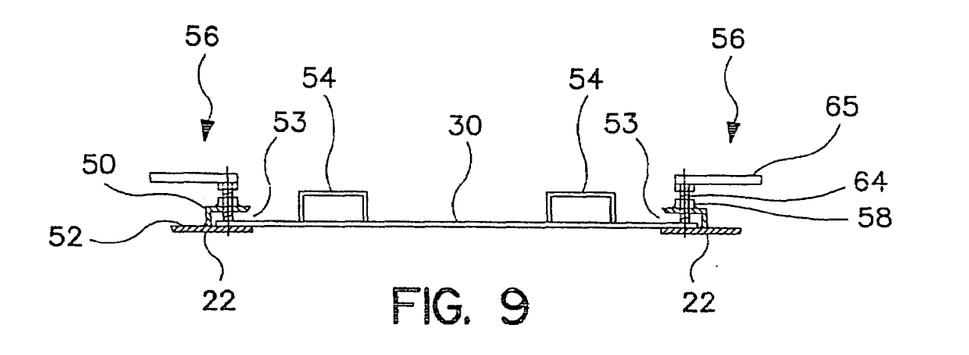

In one example, the drum has a length of about 10 feet and a diameter of about 6 feet. It is provided with a horizontal door 30. The door can be made of the same material as the drum, or it can be made of a lighter material such as aluminum so that it is lighter and easier for an operator to open and close. The door is secured to the cylindrical surface of the drum at its opposite ends so that the door can be opened by sliding the door along slots 53 formed in holders which follow the curvature of the surface of the drum as best shown in FIGS. 8 and 9. The door can be opened and held in place at any desired position to create an opening of any desired size between 0 and 20 inches wide. Therefore, the treated compost can be discharged as desired through the opening formed by the door.

Figure 6:
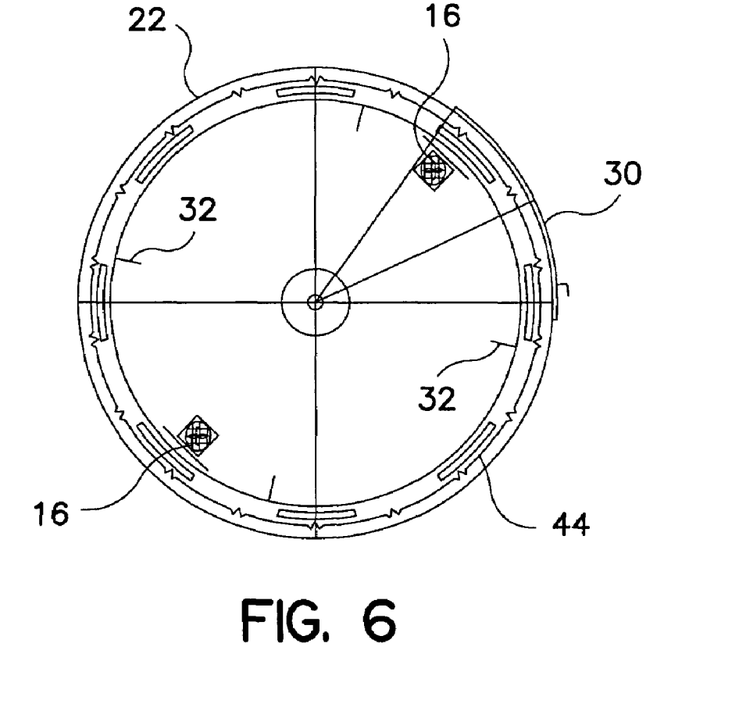
FIGS. 6 and 7 show details of the drum.
Figure 7:
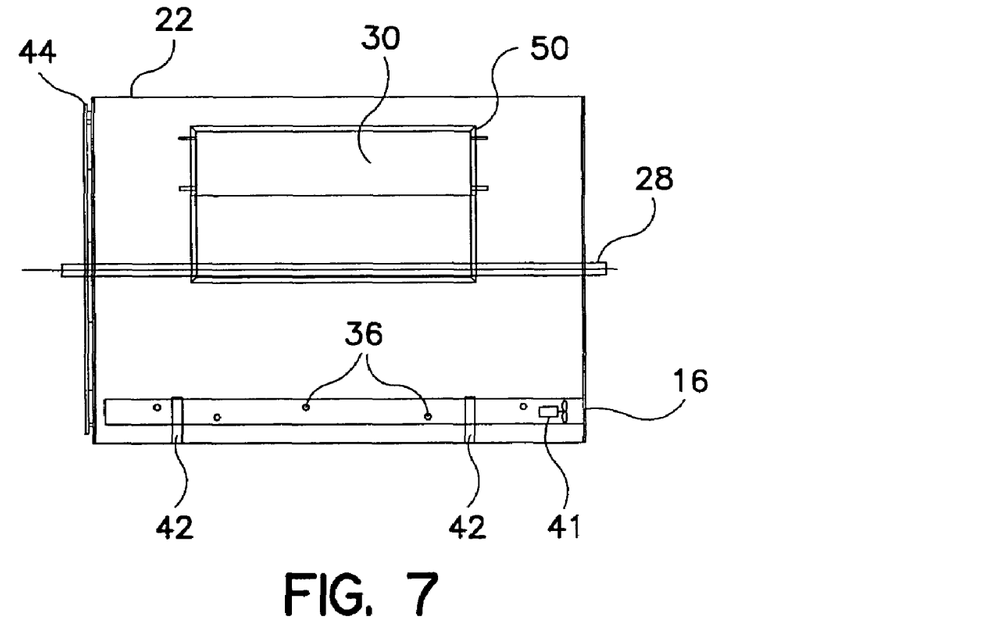

As shown in FIGS. 2 and 6, the inside of the drum is provided with means to mix the composting material. These means can be fins 32 that extend the length of the inside of the drum, or could be formed by pipes 40 which run through the drum. The fins 32, and or the pipes 40 used for this will be of a sufficient width so as to properly mix the material being composted as the drum rotates.

On one, or on both ends of the drum 22 there are openings 16 which are covered with a screen. These openings permit entry of air into the drum to aerate the composting material, as air is necessary for proper composting. It has been found, especially with larger sizes of composting drums 22, that openings 16 provide sufficient ambient air to enter the drum to support the composting process without further means being required to assist ventilation.

One of the advantages of this compost device is the door 30. The door has a curvature of the drum and is long and wide enough to cover the opening in the drum surface. The door slides along a circular space formed between an angle plate 50 on each end of the door and the outer surface 52 of the drum. The angle plate is twice as long as the door is wide so that the door can completely close the opening and completely open the opening. There are four locking devices 56 which lock the door in a closed position. However, only two of the locking devices lock the door in an open position. The lower locking devices are used to lock the door at any desired opening from fully closed to fully opened. The locking devices are formed by a nut 58 welded to an outer surface of the angle plate and a threaded bolt 64 that threads into the nut and applies a force against the door 30. The door is then secured between the end of the bolt and the surface of the drum on an outer edge of the opening. Two locking devices lock the upper end of the door in a fully closed position and the lower pair of locking devices lock the door in any desired position between fully closed and fully opened. An elongated handle 65 is secured to the outer end of the bolt for ease of threading the bolt to and from a locking position.

Figure 5:
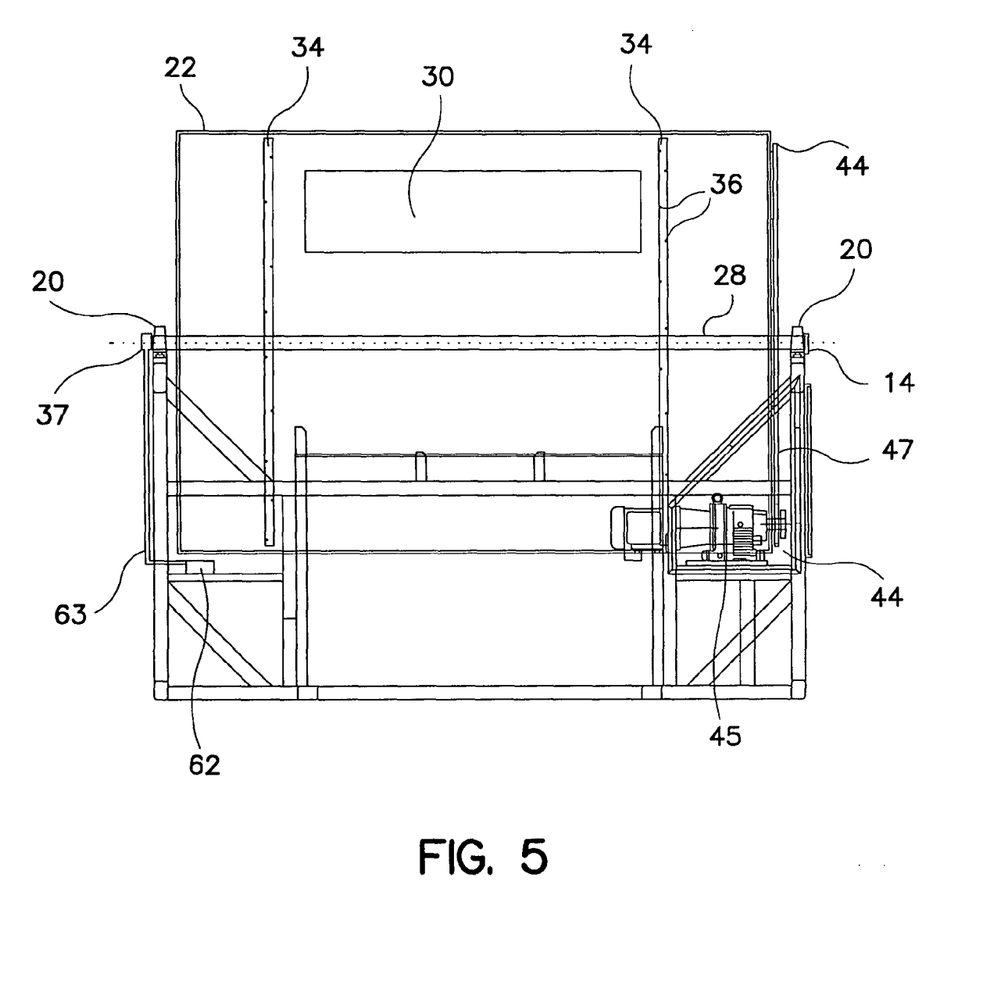
FIG. 5 shows a another embodiment for distributing air into the composting material.

If it becomes necessary to provide additional air for the composting process, as shown in FIG. 5 the drum 22 may be mounted on a substantially hollow shaft 28 with a cap 14 at one end and a swivel fitting 37 at the other end. By means of piping 63 the swivel fitting 37 is connected to an air pump 62 which provides air to a pair of radially extending tubes 34 which are secured at the center of their length to the central area of the shaft 28. The tubes 34 are also hollow, and connected in such a manner that air pumped into the hollow shaft 28 is transferred into hollow tubes 34. Each tube 34 has a series of holes 36 which allow air which is pumped into hollow shaft 28 to be forced into the drum 22 and thus mixed with the material being composted thus aerating the material to help with the composting process. It should also be noted that since the hollow tubes 34 rotate with the drum 22, these tubes 34 help to stir and mix the material within the drum, which is an aid to the composting process.

Figure 4:
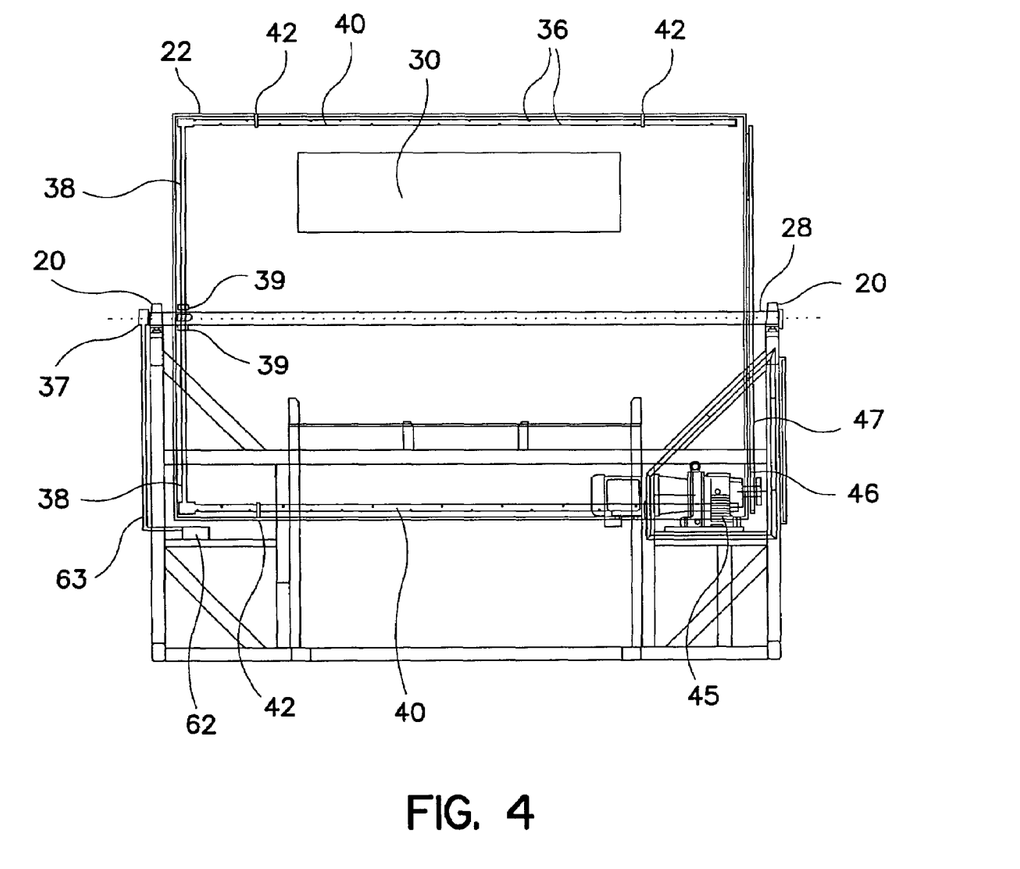
FIG. 4 shows an embodiment with tubing attached to the shaft which feeds air into the drum, further showing additional means within the drum to distribute air into the composting material.

As an alternative, the shaft 28 can have only a limited hollow section, as shown in FIG. 4, with tubes 38 leading to pipes 40 having holes 36. This provides a means whereby any air which is supplied into the drum is distributed directly into the composting material as the drum rotates. Straps, or other attaching means 42 hold pipes 40 in place as the drum rotates, and thus the pipes 40 also provide or assist with the stirring function. As a further control there is provided a separate control switch 49 which can be used to override the timer switch and turn the motor on or off at as desired by the operator.

The drum is provided with a sprocket 44 which is secured on one end of the drum. A motor 45 is secured to the frame. It includes an integrated gear reduction unit which is provided with a driven sprocket 46 in alignment with the drum sprocket 44 so that the motor can rotate the drum by a sprocket chain 47 that surrounds the drum sprocket 44 and the motor sprocket 46. The motor may be provided with a timer 48 that will control the motor so that the drum will be rotated for a set period of time and will be off for a set period of time. If means are included for providing additional air over what will be supplied by the vents 16, then these means will also be controlled by the timer 48 to control the amount of air which is added to the compost material.

In order to rotate the drum at a satisfactory revolution level, the motor is provided with a gear box through which the drive sprocket is driven. For a drum having an 82 inch sprocket and a 230 volt, 3 horsepower motor operating at 1740 rpm and a gear box that reduces the motor rpm to 121-1, the drum will rotate 30 revolutions in 15 minutes time.

In carrying out the composting process in a drum of the size mentioned above, having a length of about 10 feet and a diameter of about 6 feet, a quantity of a yard, to a yard and a half of material comprising a mixture of carbon and nitrogen in a ratio of about 30-1 is added to the drum through the door. Twenty to thirty gallons of water is then added to this material. Subsequently, the matter to be composted is added to the drum. During the composting, the motor is operated by the timer with a desired on and off period. The period required for composting is known to those skilled in the art and need not described in further detail. During the composting period air enters the drum through the openings 16. If it is determined that openings 16 provide an insufficient supply of air, and this will most likely happen with a smaller size drum, more air may be periodically directed into the drum through the various means disclosed for such. If pipes are used within the drum to aid in supplying air, these pipes can also assist as the means to mix the composting material, or at least as part of the mixing means. As the composting is carried out, more matter to be composted may be added along with additional materials set forth above. This can be done each day. Improved composting can be carried out by this apparatus because as the drum is rotated, the internal fins 32 tend to mix and aerate the compost mixture with air supplied by the end apertures 16, or if further air is required, by means of the piping arrangements. This aeration and mixing of the composting assists in the composting operation.

Figure 3:
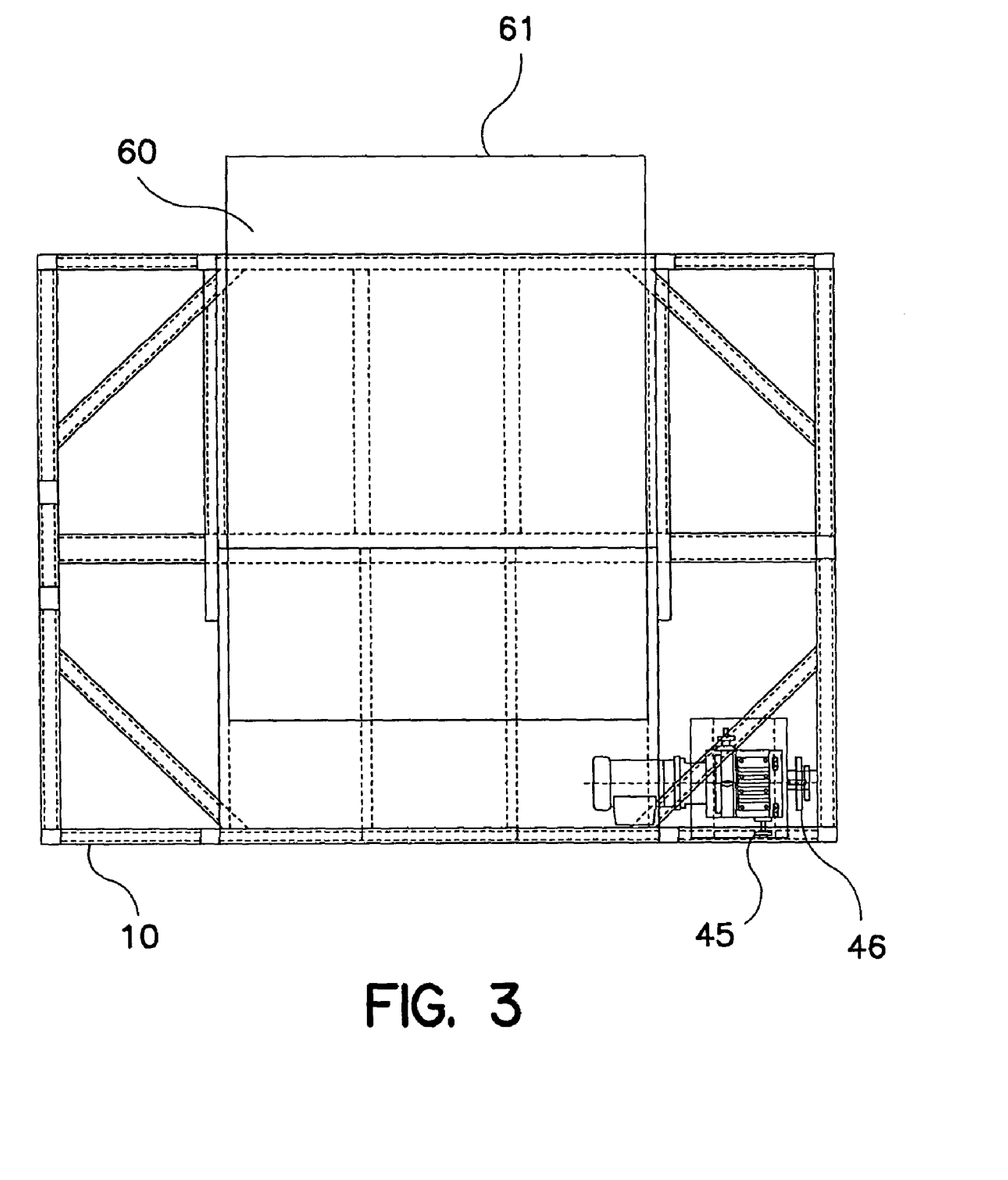
FIG. 3 illustrates a top view of the base with the composting drum removed, and also showing the hopper.

In addition to composting desired matter, as shown in FIG. 3, a hopper 60, is constructed of any desired material such as steel. The hopper 60 has a bottom surface which is large enough so that when it is positioned under the drum 22 it can catch the composted material as it falls out from door 30. The hopper 60 has three sides, each of which extends upwardly about 15 inches, and an open front end 61 so that it will catch and hold the composted material as it falls out of the door 30 when the door is open. Thus, for dumping the composting material, after the hopper is positioned under the drum, the door is opened to a desired opening, between 0 and 20 inches, and the composted material falls onto the hopper as the drum rotates. If the drum rotation is stopped, no more material will be dumped. By such an arrangement no material is dumped onto the ground as the composted material is dumped from the drum directly onto the hopper. Because the front edge 61 of the hopper does not have a wall, the composted material can be picked up from this open end of the hopper by a front end loader, and then loaded onto a vehicle for delivery for further use. Optionally, the composted material could be deposited onto a conveyer belt in order to remove that material from the environs of the drum.

One of the advantages of this composting device is the door 30, as shown in FIGS. 8 and 9. The door is constructed to have a curvature which is very close to the same curvature as the drum, and is long enough and wide enough to cover the opening in the drum surface. The door has handles 54 and slides within slots 53 created by frame 50. Frame 50 is constructed of angle iron and is attached onto the outer surface 52 of the drum, for example by welding. Both of FIGS. 8 and 9 show slots 53, or spaces formed between the angle iron 50 at either end of the door and the outer surface 52 of the drum. These slots form arcuate spaces that follow curvature of the drum. The angle iron at either end of the opening is twice as long as the door is wide. It is positioned so that as the door slides within the slots, it can completely close the opening, or can completely uncover the opening. There are four locking devices 56 which lock the door in the closed position. Each locking device 56 is formed by a hole in the angle iron with a nut 58 welded to the outer surface of the angle iron, and a threaded bolt 64 that threads into the nut 58, extends through the hole, and applies a force against the door 30. The door is thus secured between the end of the bolt and the surface of the drum at the outer edge of the opening. Elongated handles 65 can be secured to the outer end of the bolt for ease of tightening the bolt down against the door and locking the door in position.

Two locking devices lock the upper end of the door in a fully closed position and the lower pair of locking devices lock the door in any desired position between fully closed and fully opened.

As shown in FIG. 8, the door can be the piece which is cut out from the drum to make the opening. To do this, additional members 66 are welded into place on the inside surface of the drum to form backing members so that as the bolts tighten down against the door, the door is held in place between the backing members 66 and the bolts. Alternatively, if the piece cut from the drum is too heavy for easy manipulation, the door can be made from a lighter material, so long as whatever material is used for the door, the material provides sufficient strength.

In FIG. 9, the door is made slightly larger than the opening. In this case, the drum 22 itself is the backing member. As can be seen, the bolts tighten the door 30 against the drum 22 and hold it in whatever position it is desired that the door be held.

In a 3000 gallon machine, the air pump is not necessary because of the large volume of air that is in the tank. The apertures 16 in the end walls enable sufficient air to flow in and out of the unit. The larger tank provides more empty space to hold oxygen to let the pile (compost) breathe. In a smaller tank (1000 gallon) there is a need for added oxygen to obtain a steady 140°-150° temperature. There is just not enough volume in the smaller unit even with the air holes. In the smaller tank oxygen levels drop to 2 to 4 percent, and for this reason additional air needs to be supplied, such as by the means recited above. In the larger, 3000 gallon tank, at the same depth of the pile, oxygen levels are 8 to 10 percent.

The recipe that a person uses is also a large factor in keeping oxygen levels sufficiently high. Adding a bulking agent like wheat straw, cardboard, mulch, peanut hulls, or anything high in carbon that has a porosity value will help to keep the pile open, thus letting the compost breath. If a dense recipe is used, like 100% chicken litter or fine sawdust, it tends to pack together and cuts off the oxygen, thus resulting in the death of the needed bacteria to obtain heat. A user needs to place as close to a 30-1 carbon to nitrogen ratio as possible in the tank to start the process. Moisture levels need to stay in the 45 to 50% range. If too much water is allowed to build up in the tank, compositing will turn anaerobic instead of aerobic. In the larger machine there is a larger pile; however, there is a larger volume for needed air. In the small 1000 gallon machine, there is a smaller pile but the space is smaller, thus, resulting in less air available which requires the use of a supplemental air source.

Suggested sizes have been set forth for the tubing, drum etc. It would be obvious to one skilled in the art that different materials and sizes can be used without departing from the teaching of the invention.

I claim:

1. A composting apparatus comprising a frame,
   a cylindrical drum having at least substantially closed ends and a cylindrical sidewall, said drum holding material to be composted,
   means for supporting the cylindrical drum on the frame,
   means for admitting air into the drum,
   a shaft disposed axially of the drum, said shaft being secured to at least one of said substantially closed ends of the drum and mounted to the frame, so that the shaft and the drum are mounted for rotation with respect to the frame,
   mixing means secured inside the drum,
   an opening in a sidewall of the drum,
   a door panel secured by securing means to the sidewall of the drum for opening and closing the opening in the drum, and
   means to rotate the drum about the shaft,
   wherein the securing means includes a pair of slots in which the door is able to slide to open and close the opening in the cylindrical sidewall of the drum, and
   wherein the slots are formed by fastening angle iron to the outer surface of the drum, and in an opposing relationship strips are fastened to the inner surface of the drum in position so that the slots are formed between the angle iron and the strips.

2. A composting apparatus as set forth in claim 1, wherein the mixing means are a plurality of fins which are fastened to the inside surface of the sidewall of the drum.

3. A composting apparatus as set forth in claim 1, wherein the means for admitting air into the drum includes the shaft being at least partially hollow, and the means for admitting air also includes a swivel fitting through which air can be pumped into the hollow portion of the shaft.

4. A composting apparatus as set forth in claim 3, wherein the means for admitting air further includes one or more pipes secured to shaft perpendicular to the shaft for rotation therewith, said pipes having holes and being connected to the hollow portion of the shaft so that air pumped into the hollow portion of the shaft is directed to the pipes and from there through the holes in the pipes and into the composting material.

5. A composting apparatus as set forth in claim 1, wherein the means to rotate the drum about the shaft includes,
   a drive sprocket secured to one end of the drum coaxial with the axis of the drum,
   an electric motor that drives a driven sprocket positioned relative to the drive sprocket,
   a sprocket chain connecting the drive sprocket and the motor driven sprocket for rotating the drum, and
   control means for controlling the motor so that the motor rotates the drum.

6. A composting apparatus as set forth in claim 5, in which said control means includes a timer for periodically operating the motor.

7. A composting apparatus as set forth in claim 6, which includes a control switch which overrides said timer for operation of the motor.

8. A composting apparatus comprising a frame,
a cylindrical drum having at least substantially closed ends and a cylindrical sidewall, said drum holding material to be composted,
means for supporting the cylindrical drum on the frame,
means for admitting air into the drum,
a shaft disposed axially of the drum, said shaft being secured to at least one of said substantially closed ends of the drum and mounted to the frame, so that the shaft and the drum are mounted for rotation with respect to the frame,
mixing means secured inside the drum,
an opening in a sidewall of the drum,
a door panel secured by securing means to the sidewall of the drum for opening and closing the opening in the drum, and
means to rotate the drum about the shaft, wherein
the means for admitting air into the drum includes the shaft being at least partially hollow, and the means for admitting air also includes a swivel fitting through which air can be pumped into the hollow portion of the shaft,
wherein the means for admitting air further includes one or more pipes secured to the inside surface of the cylindrical sidewall of the drum, said pipes having holes, and tubes connected from the hollow portion of the shaft to the pipes so that air pumped into the hollow portion of the shaft is directed to the pipes and from there through the holes in the pipes and into the composting material.

9. A composting apparatus as set forth in claim 8, wherein the securing means includes a pair of slots in which the door is able to slide to open and close the opening in the cylindrical sidewall of the drum.

10. A composting apparatus as set forth in claim 8, wherein the one or more pipes which are secured to the inside surface of the cylindrical sidewall of the drum rotates therewith so as to help mix the material within the drum.

11. A composting apparatus comprising a frame,
a cylindrical drum having at least substantially closed ends and a cylindrical sidewall, said drum holding material to be composted,
means for supporting the cylindrical drum on the frame,
means for admitting air into the drum,
a shaft disposed axially of the drum, said shaft being secured to at least one of said substantially closed ends of the drum and mounted to the frame, so that the shaft and the drum are mounted for rotation with respect to the frame,
mixing means secured inside the drum,
an opening in a sidewall of the drum,
a door panel secured by securing means to the sidewall of the drum for opening and closing the opening in the drum, and
means to rotate the drum about the shaft, wherein the mixing means is tubular and is attached to the inside cylindrical surface of the drum, and the tubular mixing means includes spaced openings along at least a portion thereof, the tubular means being in communication with an air pump which pumps air into the tubular mixing means and through the openings into the material which is being composted, the means which connects the air pump to the tubular mixing means including a section of the shaft being hollow, and connector tubes leading from the hollow section of the shaft to the tubular mixing means.

12. A composting apparatus as set forth in claim 11, wherein the air pump is also connected to control means so that the control means can control the amount of air which is pumped into the drum.

13. A composting apparatus as set forth in claim 12, in which said control means includes a timer for periodically operating the air pump, as well as a motor which rotates the drum, and a control switch which can override the timer.

14. A composting apparatus as set forth in claim 11, wherein the shaft extends completely through the ends of the drum, and the means for supporting the drum on the frame includes oppositely disposed pillow blocks secured on the frame, which pillow blocks support opposite ends of the shaft.

* * * * *